United States Patent

Huff

[11] Patent Number: 6,041,510
[45] Date of Patent: Mar. 28, 2000

[54] EXTENSION LEVEL, SQUARE AND LENGTH GAUGE

[76] Inventor: Charles A. Huff, P.O. Box 1297, Mountain View, Calif. 94042

[21] Appl. No.: 09/044,692

[22] Filed: Mar. 18, 1998

[51] Int. Cl.[7] ..................................................... G01C 9/26
[52] U.S. Cl. .............................................. 33/374; 33/381
[58] Field of Search ............................. 33/372, 374, 376, 33/381, 383, 418, 429, 451, 474, 485, 809

[56] References Cited

U.S. PATENT DOCUMENTS

| | | | |
|---|---|---|---|
| 2,551,524 | 5/1951 | Bullivant | 33/374 |
| 2,686,974 | 8/1954 | Lanner | 33/485 |
| 2,879,606 | 3/1959 | Olivere | 33/208 |
| 3,328,887 | 7/1967 | Wright | 33/374 |
| 3,522,657 | 8/1970 | Metrulis | 33/485 |
| 4,130,943 | 12/1978 | Talbot | 33/374 |
| 4,152,838 | 5/1979 | Cook | 33/342 |
| 4,399,616 | 8/1983 | Jannson | 33/451 |
| 4,435,908 | 3/1984 | Semler, Jr. | 33/376 |
| 4,607,437 | 8/1986 | McSorley, Jr. | 33/374 |
| 4,653,194 | 3/1987 | Kim | 33/429 |
| 4,662,077 | 5/1987 | Richardson | 33/809 |
| 4,733,475 | 3/1988 | Youmans | 33/372 |
| 4,894,925 | 1/1990 | Langmaid | 33/374 |
| 4,910,876 | 3/1990 | Channel | 33/374 |
| 4,928,395 | 5/1990 | Good | 33/374 |
| 5,249,365 | 10/1993 | Santiago | 33/374 |
| 5,412,875 | 5/1995 | Hilderbrandt | 33/374 |
| 5,433,011 | 7/1995 | Scarborough | 33/376 |
| 5,617,641 | 4/1997 | Aarhus | 33/376 |
| 5,832,618 | 11/1998 | Scarborough | 33/451 |

*Primary Examiner*—G. Bradley Bennett
*Attorney, Agent, or Firm*—Julian Caplan; Flehr Hohbach Test Albritton & Herbert LLP

[57] ABSTRACT

This invention relates to an extendable level which, by means of two slidable extension members on a central body, can more than double its collapsible length. The invention comprises a device which can lock the level in any length from fully collapsed to fully extended. An attachment is provided which can convert the invented level into a large carpenter's square. Further, the extension level, with a scale on its top edge, can measure inside lengths between opposing wall surfaces.

20 Claims, 2 Drawing Sheets

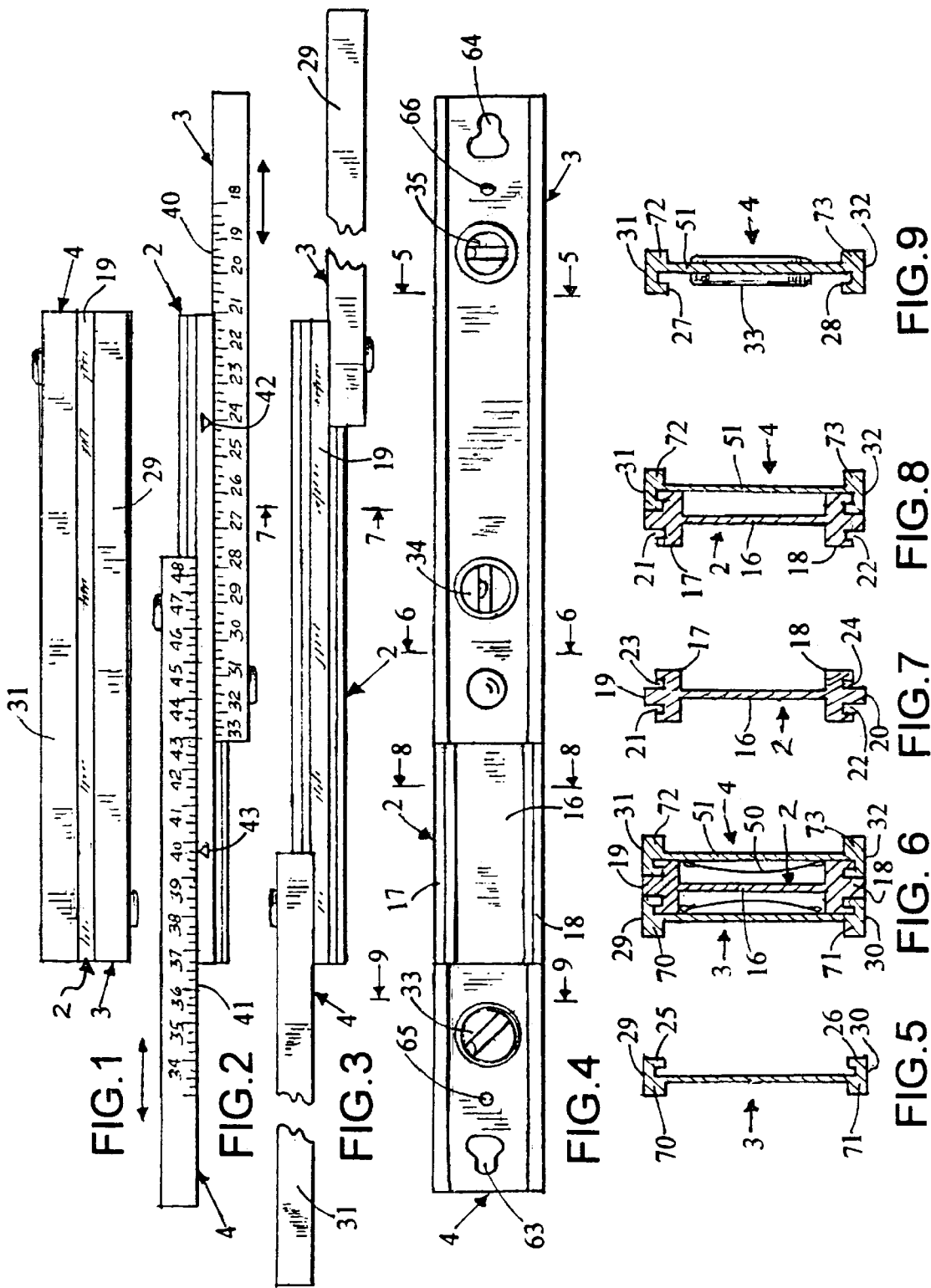

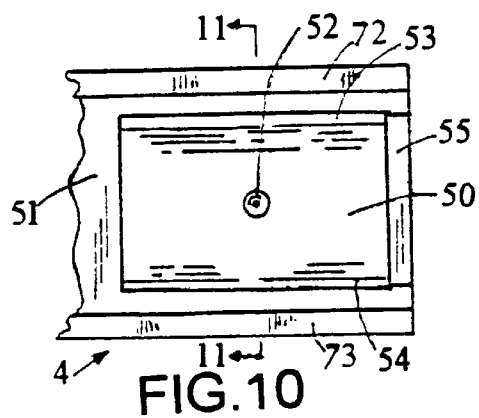
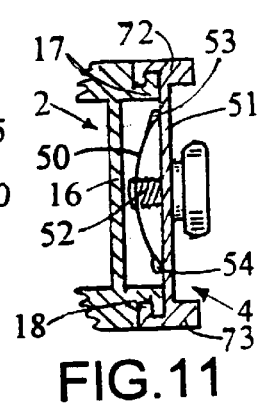
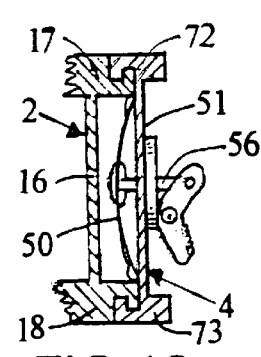
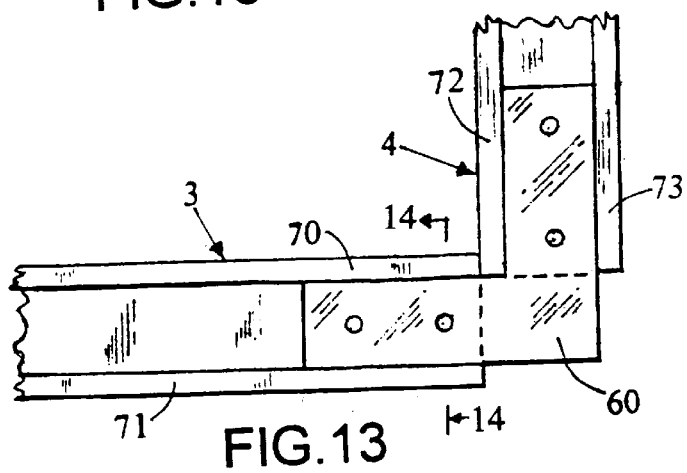
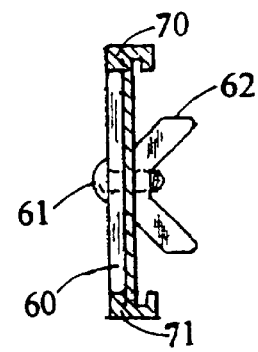
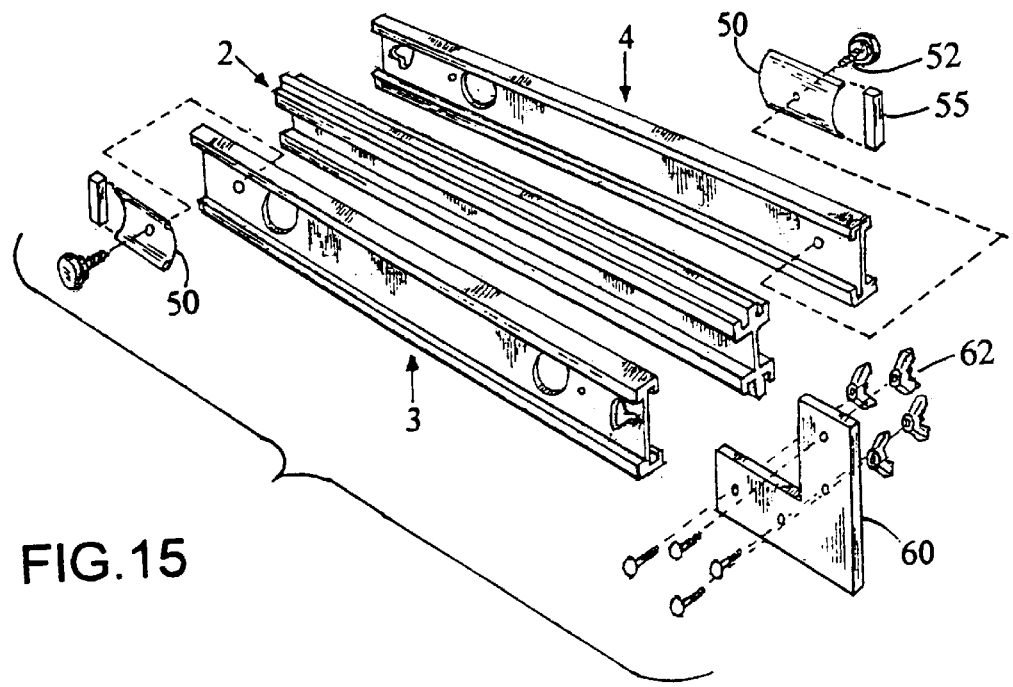

EXTENSION LEVEL, SQUARE AND LENGTH GAUGE

BACKGROUND OF THE INVENTION

This invention relates to carpenter's, mason's, pipe fitter's and other mechanic's levels, measuring devices and squares, and more particularly to levels which are adjustable in length, can measure inside dimensions and can extend to large collapsible squares. Different tasks of carpentry work requires differing lengths of levels and squares depending upon the particular project. Accordingly, levels come in many various lengths, as do carpenter's squares. A leveling device or square of a suitable and convenient length for a particular job and yet manageable in transporting and storing is very desirable. Further, a single extendable level which can meet the requirements of several individual levels is even more desirable. Finally, a single extensive level which can fit into a standard tool box, yet can meet the needs of several different length levels, as well as several tools is most desirable. Many efforts have been made to create expandable levels and collapsible squares in many configurations.

DESCRIPTION OF THE PRIOR ART

Adjustable length levels and collapsible squares are well known in the art. Many extendable levels have a leveling means in their main or central body but when the extenders are in a collapsed position the leveling bubble cannot be seen conveniently. For example, U.S. Pat. No. 4,130,943 describes an extension level which can be extended in 6 inch increments. This patented level can no more than double its length when fully extended. Its leveling means is in the central body and the level can not be locked in any extended position. U.S. Pat. No. 4,152,838 discloses a level with a sliding scale. The subject level can no more than double its collapsed length, does not have a contiguous level plane bottom surface when extended, has a leveling means in the central body and is not lockable in any extended position. U.S. Pat. No. 4,733,475 describes an extension level with a spring loaded device to allow the level to be retained in a wall opening. It is very complicated with many parts and would be expensive to construct. Components of this invention could not be extruded, hence, manufacturing costs are excessive. U.S. Pat. No. 4,894,925, discloses an extension level in which the extender rests within the main body. This invention can no more than double its collapsed length when fully extended, holds a leveling means in its main body, and is not lockable in any extended position. U.S. Pat. No. 4,928,395 discloses an extendable level which has two extensions which are slidable within a two piece main body. This level can not more than double its length in its fully extended position, does not have a contiguous level plane bottom surface when extended, and is not lockable in any extended position. U.S. Pat. No. 4,910,876 discloses a level attachment arm which forms a square with one I beam shaped level. U.S. Pat. No. 5,249,365 discloses a level with telescoping sleeve extenders. This level does not provide a contiguous level plane bottom edge surface when extended, nor is it lockable in any extended position. U.S. Pat. No. 5,412,875 discloses an extension level with at least one leveling vial mounted within the main frame and an elongated arm fabricated of transparent material. This invention can no more than double its length when fully extended, has a leveling means in its main body, is not lockable in any extended length, and parts can not be extruded. U.S. Pat. No. 5,617,641 describing an adjustable length level incorporating rods as extenders. The level described in this patent does not have a desired contiguous plane bottom edge surface, is not lockable in any extended position, and main body members can not be extruded.

Prior art extendable levels all suffer from one or more of the following drawbacks: Too bulky, can only less than double their collapsed length, have only one extension member, do not have a level plane along the entire longitudinal edge of the level when extended, are not lockable in any extended position, are too expensive to construct, components cannot be extruded, are unstable or structurally weak or too complicated, with complex structures and multiple parts.

SUMMARY OF THE INVENTION

The present invention provides an infinitely adjustable length level with two identical sliding extendable bodies, one on each side of a centrally located body, which extend out from opposite ends of the central body. Preferably, these three principal parts are of extruded aluminum. The central body includes a webbing which includes top and bottom horizonal tracks on each side to accommodate the corresponding longitudinal sliding rails in the webbing of the two extension bodies. Each track and corresponding slide rail interslides. Each sliding extending body includes a device to lock the extender to the central body in any position from fully collapsed to fully extended. The central body may have apertures in its center web panel to lighten the level or, for simplicity, have no apertures. Each of the two sliding side extension bodies includes space and one or more apertures to accept leveling and plumbing means such as one or more bubble vials, digital leveling devices, or laser devices, and a hang-up hole. The vertical central web panel of the central body includes a light reflective color such as white to make each bubble vial on the sliding extensions optimally visible when overlapping the central body.

The primary object of the present invention is to provide an extendable level which will overcome the shortcomings of the prior art while also providing a means for accurately measuring the inside distance between two opposing surfaces or walls and further providing two identical arms, along with an attachment to create a large square.

Another object of this invention is to provide an extendable level which can fit into a standard tool box or brief case in its collapsed length, and be handled and stored conveniently, yet be able to be utilized as a level up to four feet long.

Another object of this invention is to provide an extendable level which, with two slidable extensions, can be extended to almost three times its collapsed length, or, in the preferred embodiment, 18 inches to 48 inches, 267%.

Another object of this invention is to provide an extendable level which can be adjusted and stationarily locked in any length from a fully collapsed position to a fully extended position against relative lateral movement of the component parts thereof.

Another object of this invention is to provide an extendable level having a contiguous planar relationship between its extended longitudinal bottom edges in any position, from fully collapsed to fully extended.

Another object of this invention is to provide a simple extendable level of few parts which is structurally sound and preferably mainly constructed of two extrusions and which is economical to manufacture.

Still another object of this invention is to provide an expandable level which when two identical sliding extension side members are removed from the central body and attached to an optional right-angled corner plate, together will form a carpenter's square in addition to a desirable leveling means.

Yet another object of the present invention is to provide an extendable level with an independently calibrated scale on the top edge surface of each of the two sliding extenders which when oriented with a reference point on the central body, will accurately measure the distance from one extreme end of the level to the opposite extreme end in any position from fully collapsed to fully extended.

Another object of the present invention is to provide an adjustable level which, by extending one of either sliding side extensions a few inches, will expose a hole for hanging the level in storage as well as a means to slide the extension relative to the central body.

One more object of this invention is to provide a sliding extendable level with open-ended longitudinal tracks which are not likely to clog and are easily cleared or cleaned, and will allow the slidable extension members to be easily removed from the central body.

These and other objects or advantages of the present invention will become fully apparent from the following description, when taken in connection with the accompanying drawings.

BRIEF DESCRIPTION OF THE DRAWINGS

FIG. 1 is a top plan view of the present invention in a fully collapsed position;

FIG. 2 is a top view of the present invention in a partially extended position, showing an optional measuring scale;

FIG. 3 is a top plan view of the present invention in a fully extended position; partially broken away to conserve space.

FIG. 4 is a side view of the structure of FIG. 2;

FIG. 5 is a cross sectional view taken along line 5—5 of FIG. 4;

FIG. 6 is a cross sectional view taken along line 6—6 of FIG. 4;

FIG. 7 is a cross sectional view taken along line 7—7 of FIG. 3;

FIG. 8 is a cross sectional view taken along line 8—8 of FIG. 4;

FIG. 9 is a cross sectional view taken along line 9—9 of FIG. 4;

FIG. 10 is an fragmentary side view of the locking device on a sliding extension member of the present invention;

FIG. 11 is a cross section view taken along line 11—11 of FIG. 10 with additional structure added and with the locking device in an open position, with a "thumb-screw" activator;

FIG. 12 is a cross section view taken along line 11—11 of FIG. 10 with additional structure added and with the locking device in an engaged or locked position, with a toggle activator;

FIG. 13 is a partial side view of the present invention with the square attachment engaging extension bodies;

FIG. 14 is a cross sectional view along line 14—14 of FIG. 13;

FIG. 15 is an exploded perspective view of the present invention illustrating the positioning of its parts.

DETAILED DESCRIPTION

Referring to FIG. 2 and FIG. 4, the present invention comprises a centrally located base body 2 and two slidable extension bodies 3 and 4 on opposite sides of central body 2. The main central body 2, has a vertical center web 16 with a top flange 17 and a bottom flange 18. As shown in FIG. 7, extruded flanges 17 and 18 on the central body, include external planar edges 19 and 20 and longitudinal grooves 21, 22, 23 and 24 formed in edges 19 and 20. Grooves 21–24 accept and interact with the sliding tongues 25, 26, 27 and 28, (see FIG. 5 and FIG. 9), of the top and bottom extruded flanges 70, 71, 72, 73 on the extension bodies 3 and 4, which have edges 29, 30, 31 and 32 which are co-planar in the edges 19 and 20 in the assembled position of the device (see FIG. 6). The pair of slide tongues 25 and 26 on extension body 3 and the corresponding grooves 21 and 22 that they slide within comprise a sturdy and stable interslidable attachment structure of the extension body 3 to the central body 2. By sliding the extension body 3 beyond the central body's 2 open ended grooves 21 and 22, the two bodies are simply disengaged and separated. The other extension body 4, with its sliding tongues 27 and 28, has the same interacting relationship with the central body 2, with its corresponding grooves 23 and 24 as does the previously described extension body 3, see FIG. 6. Each extension body 3 and 4 is slidably attached and inwardly faced to opposite sides of the central body 2 and are extendable lengthwise in opposite directions, as illustrated in FIG. 2. The engagement between the central body and the extenders is snug enough to permit the continuously planar individual edges 19, 29, 31 and 18, 30, 32 of the three body members to be accurately co-planar in the same top plane and bottom plane.

The first extension body 3 includes apertures 34 and 35 and the second extension body 4 includes an aperture 33, as seen in FIG. 4, receiving leveling or plumbing assemblies such as a bubble vial or digital device. Transparent leveling devices in apertures 33, 34 and 35 are readily visible when extended beyond the central body 2 or are easily visible when overlapping a light reflective color surface, such as white, of the sides 16, FIG. 4 of the central body 2.

A measuring scale 40 and 41 is applied to the top surface edge face of each of the respective extender bodies 3 and 4 as seen in FIG. 2. When in a measuring mode, the extension level is fully collapsed as in FIG. 1. One extension body 3 is then extended to the desired length to be measured end to end. The length measurement is read on the scale 40 at a corresponding reference point 42 on the central body 2. After the extension body 3 is fully extended as in FIG. 3, any longer distance measurement is read on scale 41 at reference point 43 by extending the other extendable body 4 while the first extension body 3 is fully extended. The maximum distance measurable between the extreme ends of the adjustable level is read on scale 41 at reference point 43 when both extension bodies 3 and 4 are in their fully extended positions.

With reference to FIGS. 10, 11 and 12, side and end views are shown of a locking rectangular panel 50 which is curved on its horizonal axis and forcibly held against the vertical center web 51 of extension body 4 by a threaded cylindrical shaft 52, such as a thumb screw, through a hole in the center of the panel 50, see FIG. 10. The panel 50 is constructed of a material, such as spring steel, which has a memory of its original shape. The center of the panel 50 is pulled toward or pushed away from the center web 51 of extension body 4 by rotating threaded shaft 52 while the upper edge 53 and the bottom edge 54 of the panel 50 stay in contact with and slide upon the center web 51 as these edges are continually under a spring tension. The described action extends or retracts the upper edge 53 and the lower edge 54 of the panel 50 towards or away from the top and bottom flanges 17 and 18 of the central body 2. Other adjustable means to move the center of the panel 50 toward or away from the web 51 such as a levered solid shaft 56 attached to the panel 50 by a toggle 56 as shown in FIG. 12 are within the scope of the invention. FIG. 11 shows the locking device in an open position and FIG. 12 shows the locking device in a locked position. As the locking panel's 50 upper and lower edges 53 and 54 engage the central body's 2 webbings, see FIG. 12, its wedging action prevents lateral movement of the extension body 4 in relation to the central body 2. Additionally, a guide plate 55 maybe mounted on the end and perpendicular to the horizonal edges of the extension body 4 and in contact adjacent the vertical edge of the panel 50 to insure that the locking plate's horizonal edges are in true alinement position to the supporting extension body 4 and thereby engaged central body 2. The guide plate 55 may be attached to the end of the extension body by means common to the art, such as cementing, riveting, or welding. Preferably, a polymer or other thick dip coating is applied to the locking panel's 50 top and bottom edges 53 and 54, to assist in their wedging lock action when engaged with the central body 2. An identical locking panel device as described herein is to be attached in the same manner to the same respective end of extension body 3 in relation to the central body 2.

The extension level according to the present invention includes an attachment 60, as illustrated in FIG. 13 and FIG. 14, to the extension bodies 3 and 4 which are separated from the central body. The union of these three parts creates a large carpenter's square with a leveling and plumbing capacity. The attachment plate 60 tightly fits in the outside recess webbing wall of each extension body as shown in FIG. 13 and FIG. 14 to insure accuracy and prevent distortion. The square attachment 60 is fixed to the extension bodies 3 and 4 by bolts 61 and wing nuts 62, as seen in FIG. 14, or other means common to the art. On each extension body, the bolt attaching the square plate 60 closest to the corner, will pass through the hang-up hole 63 or 64 as seen in FIG. 4, the other bolt will pass through an accurately sized and placed hole 65 or 66 as seen in FIG. 4, to prevent movement of the attachment 60 relative to the two extension bodies 3 and 4.

One of either convenient hang-up holes 63 or 64 can easily be exposed on the invented expansion level by extending one of the two expansion bodies 3 or 4 a few inches from the main central body.

It will be understood that the tongues and grooves mentioned in the accompanying claims may be reversed in position. In other words, for example, groove 21 may be replaced with a tongue and tongue 25 of body 3 replaced with a groove to receive the tongue on central body flange 17.

The present embodiment described herein is to be considered in all respects as illustrative and not restrictive. While this one embodiment of the invention has been shown and described, it will be apparent that other adaptions and modifications of this invention can be made by those skilled in the art without exceeding the essence and scope of the invention as defined in the following claims.

What is claimed is:

1. An extensible level comprising:
a central body having a top center flange, a bottom center flange and a center web interconnecting said top and bottom center flanges, said top and bottom center flanges having central body top and bottom external center planar edges, said external center planar edges extending the full length of said central body,
said top center flange having a lateral center extension, said lateral center extension being formed with a longitudinal groove, said groove opening upward,
a first extension body parallel to and on one side of said central body having a top extension flange, a bottom extension flange and an extension web interconnecting said top and bottom extension flanges, said extension flanges having external top and bottom extension planar edges, respectively,
said top extension flange having a top lateral extension member having a lower surface formed with a top tongue, said top tongue fitting downward into said top longitudinal groove, said extension body being longitudinally slidable relative to said central body by sliding movement of said top tongue in said top groove, each said center planar edge being co-planar with one of said extension planar edges,
said first extension body lying totally on one side only of said center web.

2. A level according to claim 1 in which said bottom center flange has a lateral extension, said lateral extension being formed with a second longitudinal groove, said second longitudinal groove opening downward,
said bottom extension flange having a bottom lateral extension member formed with a second tongue, said second tongue fitting upward into said second longitudinal groove with a sliding fit.

3. A level according to claim 1 which further comprises
a second extension body parallel to and on a side of said central body opposite said first-mentioned extension body,
said top central flange having a second top lateral center extension, said second top lateral center extension being formed with a second longitudinal groove, said second groove opening upward,
said second extension body having a second top extension flange, a second bottom extension flange and a second extension web interconnecting said second top and bottom extension flanges, said second extension flanges having external top and bottom planar edges, respectively,
said second top extension flange having a second top lateral extension member formed with a second top tongue, said second top tongue fitting downward into said second top longitudinal groove, said second extension body being longitudinally slidable relative to said central body and to said first-mentioned extension body by sliding movement of said second top tongue in said second top groove, each said center planar edge being co-planar with one of said second extension planar edges.

4. A level according to claim 3 in which said bottom center flange has a second lower lateral extension above the plane of said bottom center planar edge, said second lower lateral extension being formed with a second bottom longitudinal groove, said second longitudinal groove opening downward,
said second bottom extension flange having a second bottom lateral extension member having an upper surface formed with a second bottom tongue fitting upward into said second bottom longitudinal groove with a sliding fit.

5. A level according to claim 1 in which said extension web has a leveling device.

6. A level according to claim 5 in which said center web is formed as a reflective contrast surface to increase the visibility of said leveling device.

7. A level according to claim 1 which further comprises locking means on said extension web having a locking position and a relaxed position, a lock to move said locking means between locking and relaxed positions, said locking means engaging said central body when in locking position.

8. A level according to claim 1 which further comprises a flexible panel along said extension web having a locking position and a relaxed position, a lock on said extension web to move said panel between locking position and relaxed position, said central body being movable relative to said extension body when said panel is in relaxed position, said panel engaging one of said center flanges when in locking position to restrain relative movement of said central body and said extension body.

9. A level according to claim 8 in which said lock comprises a screw rotatable in said extension web and in threaded engagement with said panel.

10. A level according to claim 8 in which said lock comprises a toggle carried by said extension web connected to said panel.

11. A level according to claim 1 in which said extension web is formed with an aperture adjacent an end of said extension web for hanging said level from a support.

12. A level according to claim 1 in which said top extension planar edge is formed with a scale and said top center planar edge is formed with a reference point to read said scale.

13. A level according to claim 12 in which said extension body has an outer and an inner end, said scale having an outer terminus spaced from said outer end a distance equal to the distance of said reference point to an adjacent end of said central body.

14. A level according to claim 13 in which said scale has an inner terminus substantially co-extensive with said inner end of said extension body.

15. A level according to claim 3 in which said first-mentioned top extension planar edge is formed with a first scale and said top center planar edge is formed with a first reference point to read said first scale, said second top extension planar edge being formed with a second scale and said top center planar edge is formed with a second reference point to read said second scale.

16. A level according to claim 15 in which said first-mentioned and second extension bodies have opposed outer and inner ends, said first scale having a first outer terminus spaced from said first-mentioned outer end a distance equal to the distance of said first reference point to a first adjacent end of said center body, said second scale having a second outer terminus spaced from said second outer end a distance equal to the distance of said second reference point to a second adjacent end of said center body opposite said first adjacent end.

17. A level according to claim 16 in which said first scale has a first inner terminus substantially co-extensive with said second adjacent end of said first-mentioned extension body and said second scale has a second inner terminus substantially co-extensive with said second adjacent end of said second extension body.

18. A level according to claim 3 in which said first-mentioned and said second extension bodies are removable from said center body.

19. A level according to claim 18 in which said first-mentioned top and bottom flanges are spaced apart a fixed distance and said second top and bottom flanges are spaced apart a fixed distance and which further comprises a right-angle attachment having a first member having parallel first inner and outer edges and a second member having parallel second inner and outer edges perpendicular to said first inner and outer edges, said first member fitting between said first-mentioned top and bottom extension flanges and against said first-mentioned extension web, said first inner edge engaging said first-mentioned top extension flange and said first outer edge engaging said first-mentioned bottom extension flange, said second member fitting between said second top and bottom extension flanges against said second extension web, said first-mentioned extension body and said second extension body being precisely at right angles to each other to form a square.

20. The combination of claim 19 which further comprises fasteners to fasten said attachment to said first-mentioned and second extension bodies.

* * * * *